Figure 7:
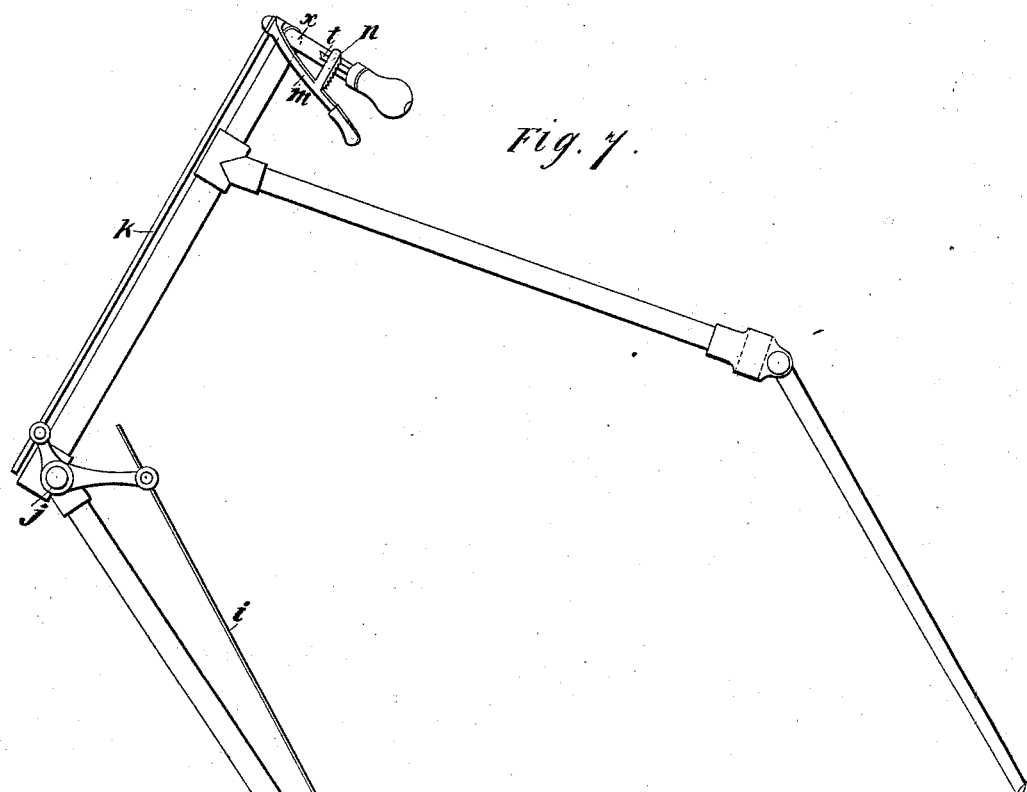

(No Model.) 2 Sheets—Sheet 1.
J. CLOUGH & G. CARTER.
VARIABLE SPEED GEAR FOR VELOCIPEDES.
No. 426,524. Patented Apr. 29, 1890.
Fig. 1.
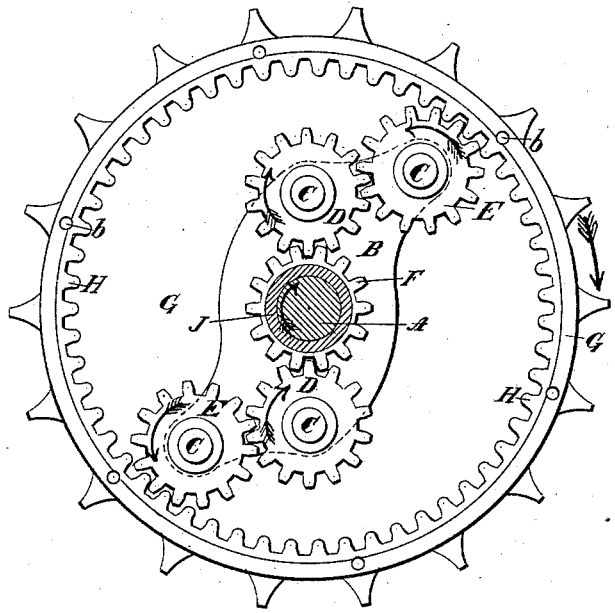
Fig. 2.
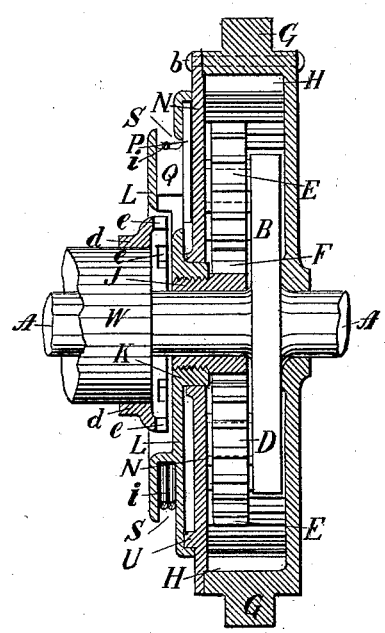
Fig. 3.
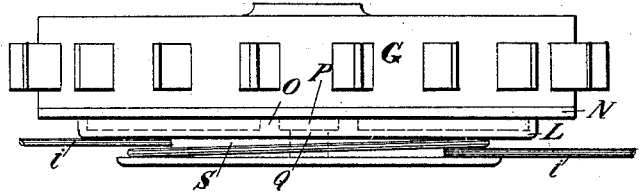
Fig. 4. Fig. 5. Fig. 6.
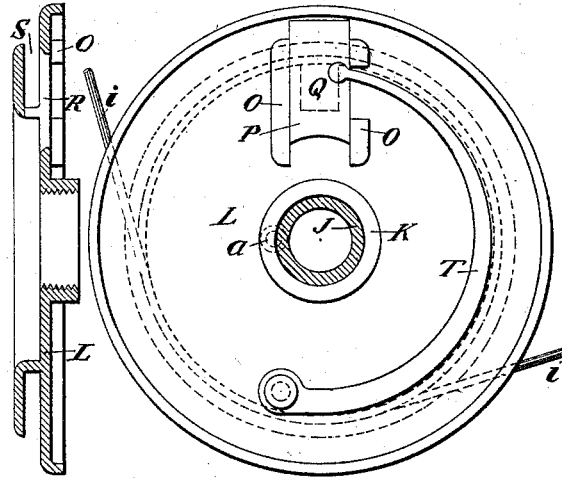
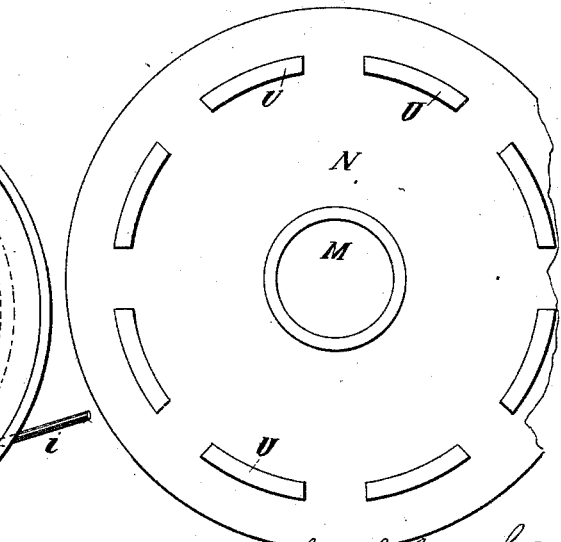
Witnesses
Thomas Durant
E. D. Smith
Inventors John Clough &
George Carter
by Church & Church
their Attys

UNITED STATES PATENT OFFICE.

JOHN CLOUGH AND GEORGE CARTER, OF BRADFORD, ENGLAND.

VARIABLE-SPEED GEAR FOR VELOCIPEDES.

SPECIFICATION forming part of Letters Patent No. 426,524, dated April 29, 1890.

Application filed January 3, 1890. Serial No. 335,750. (No model.)

*To all whom it may concern:*

Be it known that we, JOHN CLOUGH and GEORGE CARTER, subjects of the Queen of England, residing at Bradford, England, have invented certain Improvements in Variable Speed or Speed and Power Driving Mechanism for Velocipedes, of which the following is a specification.

This invention relates to improvements in variable speed or speed and power driving mechanism for velocipedes, and its object is to provide a simple and compact gear particularly adapted for driving safety bicycles or tricycles without materially increasing the weight or bulk of the driving mechanism.

The said improvements consist in the arrangement of mechanism hereinafter described, whereby the chain-wheel is driven direct for speed, and for power the speed of such wheel is reduced in relation to the crank-shaft through the medium of a sun-and-planet motion.

In the accompanying drawings, Figure 1 is an elevation of the chain-wheel with the side plate removed to disclose the internal mechanism. Fig. 2 is a diametrical section of the complete wheel, and Fig. 3 is a plan view of such wheel. Figs. 4, 5, and 6 are views of details hereinafter referred to. Fig. 7 is a side elevation of a portion of the frame-work of a safety-bicycle, illustrating a convenient method of changing the gear from speed to power or the reverse.

The crank-shaft A has a plate B formed with or rigidly keyed thereto and provided with four studs C, on which are mounted the two pairs of cog-wheels D D and E E, arranged in a recess in the face of the chain-wheel G. Internal teeth H round the periphery of such recess engage the wheels E E, and a pinion or sun wheel F, loosely mounted upon the shaft A, engages the planet-wheels D D. The wheels D D and E E are simply provided in pairs to balance the chain-wheel and increase the strength of the gearing.

When running at speed, the sun-wheel F is locked to the shaft A or wheel G, so as to revolve therewith. Thus the chain-wheel revolves at the same speed as the shaft A, and the above-described internal mechanism has no independent motion; but to increase the power the speed of the chain-wheel G in relation to the crank-shaft is reduced by locking the sun-wheel F to a fixed part of the machine, so as to hold it stationary while the crank-shaft A is operated. In this case, as well as in the former case, the chain-wheel is driven from the crank-shaft by the plate B and wheels E E; but in the former case such wheels were prevented from independent rotation by the sun-wheel F, locked to the driving-shaft, while in the latter case a retrogressive motion is imparted to the wheels E E through the medium of the wheels D D from the stationary sun-wheel F during each revolution of the shaft A, which retrogressive rotation taking place in the wheels E E the chain-wheel G, driven thereby, revolves at a slower speed than the crank-shaft. This is most clearly shown in Fig. 1, where, assuming the wheel F to be held stationary and the shaft A to be rotated in the direction of its arrow, the wheels D D and E E are independently rotated upon their studs C in the direction shown by the arrows.

To effect the locking and unlocking of the sun-wheel F, so as to hold it stationary or cause it to revolve with the crank-shaft A, we provide such wheel with a boss J, screwed into the central boss K of the plate L and keyed thereto by a small key or screw *a*. The plate L is separately represented in section by Fig. 4, and Fig. 5 is an interior view of such plate with its attachments. The boss K of the plate L extends through the central opening M in the plate or cover N, (an outer view of which is separately shown by Fig. 6,) fixed so as to inclose the recess in the chain-wheel G by rivets *b*, passed through the periphery of such chain-wheel and plate. The plate L is provided with radial guides O, between which a bolt P fits, having a projection Q extending through the slot R in such plate and across the annular groove S, formed on the outer face of said plate, and the spring T, fixed inside said plate, is connected by its free end to said bolt and tends to press the latter to its outward limit. In this position the end of the bolt P lies between two of the projections U on the face of the cover N, and thus locks the plate L and the sun-wheel F, fixed thereto, to the cover N, causing them to revolve at the same speed as the crank-shaft A and prevent the above-mentioned retrogressive motion of the wheels D D and E E. With the bolt P in this position it will be seen that the whole of the mechanism is locked to the chain-wheel and revolves with the latter at the same speed as the crank-shaft. If, however, the bolt P is pressed inward, so that its outer end disengages the projections U and the projection Q on such bolt engages one of the notches e in the ring d, rigidly fixed to the bearing-box W, the plate L and wheel F are locked fast and a slower motion is communicated to the chain-wheel from the crank-shaft through the medium of the wheels D D and E E. The said reduction in speed of the chain-wheel in relation to the speed of the crank-shaft is directly in proportion to the relative sizes of the sun-wheel F and the wheel formed by the interior teeth H of the chain-wheel G.

We preferably operate the bolt P by means of a light wire $i$, coiled once round the annular groove S. Such wire when slack allows the spring T to keep the outer end of the bolt P locked between the projections U; but when such wire is drawn tightly round the annular groove it engages the projection Q on the bolt and presses it inward, so that it is released from between the projections U and engages one of the notches e. Immediately, however, the wire $i$ is slackened, the bolt, under the influence of its spring, is restored to its original position.

The wire $i$ may be placed under the control of the rider in a variety of ways and be regulated either by the hand or foot. We illustrate a method, however, which we find convenient in Fig. 7. The wire $i$ is carried up from the wheel G to the bell-crank lever pivoted at $j$, and such lever is operated by a rod $k$ from the hand-lever $m$, arranged in a similar manner to an ordinary brake-lever. The hand-lever is provided with a rack $n$, engaging a catch $t$ on the handle-bar $x$, so as to hold such lever up when the wire $i$ is drawn tight and prevent it becoming slack until the rack $n$ is pushed off the catch $t$.

Having now particularly described and ascertained the nature of our said invention and in what manner the same is to be performed, we declare what we claim is—

1. In speed and power driving mechanism for velocipedes, the combination, with a crank-shaft to which the power is applied, having a rigid plate or arm carrying a planet-wheel and intermediate wheel, of a sun-wheel engaging said planet-wheel and capable of being locked so as to revolve with said shaft or to be held stationary, and a chain-wheel having internal teeth engaging said intermediate wheel, substantially as herein shown and described, and illustrated in the accompanying drawings.

2. In speed and power driving mechanism for velocipedes, a crank-shaft carrying a planet and intermediate wheel, the latter engaging interior teeth on the chain-wheel, and a sun-wheel mounted on the crank-shaft and provided with a disk or plate having a radial bolt adapted to lock said sun-wheel so as to revolve with the chain-wheel or to hold it stationary, substantially as herein shown and specified.

3. In a variable or speed and power gearing for velocipedes, the combination, with the drive shaft and wheel, the intermediate gearing, and a radial bolt for throwing said gearing into or out of operation, of an annular groove into which said bolt projects, and a wire coiled in said groove for operating the bolt, substantially as described.

4. In a variable-power gearing for velocipedes, the combination, with the crank-shaft to which the power is applied, a sprocket-wheel mounted on said shaft, intermediate gearing for changing the relative speed of the same, and a bolt controlling said gearing, of an annular groove into which the bolt projects, a wire coiled in said groove, and a lever on the handle-bar controlling the wire, whereby the bolt may be moved and the intermediate gear thrown into or out of operation, substantially as described.

In testimony whereof we have hereunto set our hands in the presence of the two subscribing witnesses.

JOHN CLOUGH.
GEORGE CARTER.

Witnesses:
SAMUEL A. DRACUP,
DAVID NOWELL.